Figure 9:
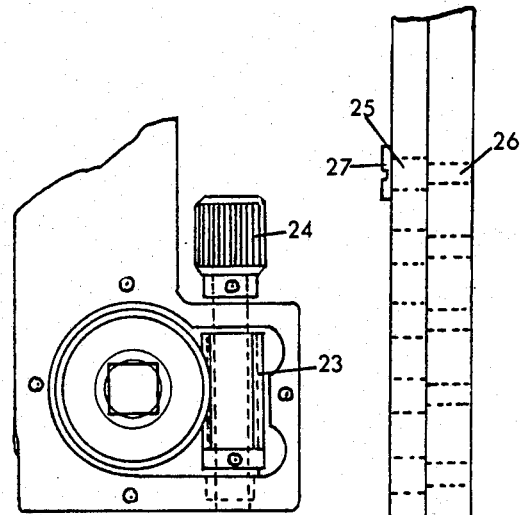

United States Patent [19]

Stapleton

[11] Patent Number: 4,650,142

[45] Date of Patent: Mar. 17, 1987

[54] TILTABLE MOUNTINGS

[75] Inventor: Harold R. Stapleton, Pakenham, England

[73] Assignee: W. Vinten Limited, England

[21] Appl. No.: 83,847

[22] Filed: Oct. 11, 1979

Related U.S. Application Data

[63] Continuation-in-part of Ser. No. 911,674, Jun. 1, 1978, abandoned.

[51] Int. Cl.[4] .......................................... F16M 11/12
[52] U.S. Cl. .................................. 248/184; 248/278
[58] Field of Search ............ 248/122, 124, 184, 240.4, 248/278, 280.1, 281.1, 284, 183, 185, 323, 324, 325, 326, 652, 486; 74/600

[56] References Cited

U.S. PATENT DOCUMENTS

| | | | |
|---|---|---|---|
| 148,922 | 3/1874 | Brown | 74/600 |
| 612,135 | 10/1898 | Linn | 248/240.4 X |
| 1,231,635 | 7/1917 | Nelson | 248/284 X |
| 1,266,367 | 5/1918 | Wilson | 248/284 X |
| 2,514,313 | 7/1950 | Davidson | 248/183 |
| 2,666,610 | 1/1954 | Nerman | 248/183 |
| 3,008,259 | 11/1961 | Zornes | 248/284 X |
| 3,041,034 | 6/1962 | Wilkinson | 248/284 |
| 3,058,146 | 10/1962 | Harrison et al. | 248/284 X |
| 3,123,330 | 3/1964 | Forbes-Robinson | 248/183 |
| 3,160,349 | 12/1964 | Kent | 248/284 X |
| 3,467,350 | 9/1969 | Tyler | 248/325 |
| 3,593,952 | 7/1971 | Smith | 248/284 |
| 4,159,093 | 6/1979 | Hamilton | 248/284 |

FOREIGN PATENT DOCUMENTS

| | | | |
|---|---|---|---|
| 1071423 | 5/1954 | France | 248/284 |
| 1331613 | 5/1963 | France | 248/284 |
| 2222730 | 10/1974 | France | . |
| 7805887 | 2/1979 | Netherlands | 248/284 |
| 20056 | of 1895 | United Kingdom | 248/486 |
| 512025 | 8/1939 | United Kingdom | 248/284 |

Primary Examiner—Ramon O. Ramirez
Attorney, Agent, or Firm—Larson and Taylor

[57] ABSTRACT

A tiltable mounting comprising a light weight tiltable mounting head for an article such as a television camera wherein the alignment of the center of gravity of the article and mount combined with the tilt axis is easily attainable. Fine adjustment is provided by a worm and wormwheel combination.

7 Claims, 9 Drawing Figures

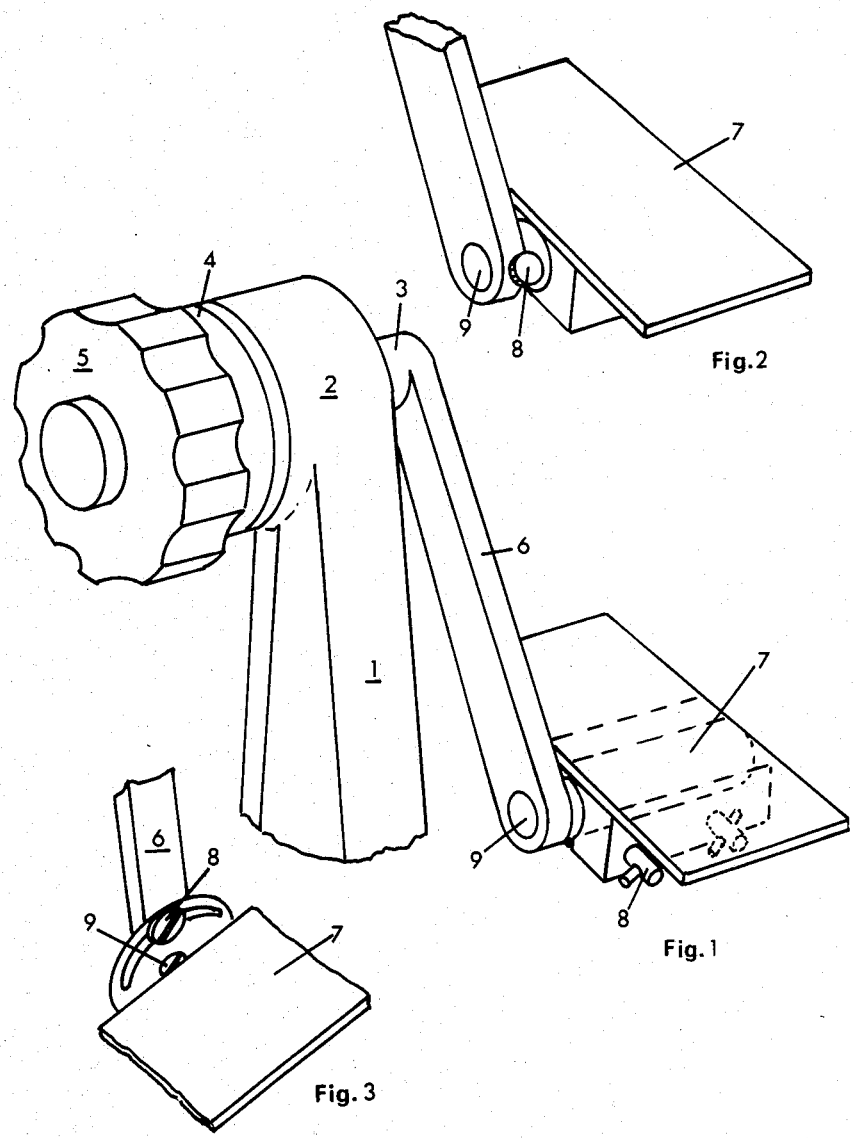

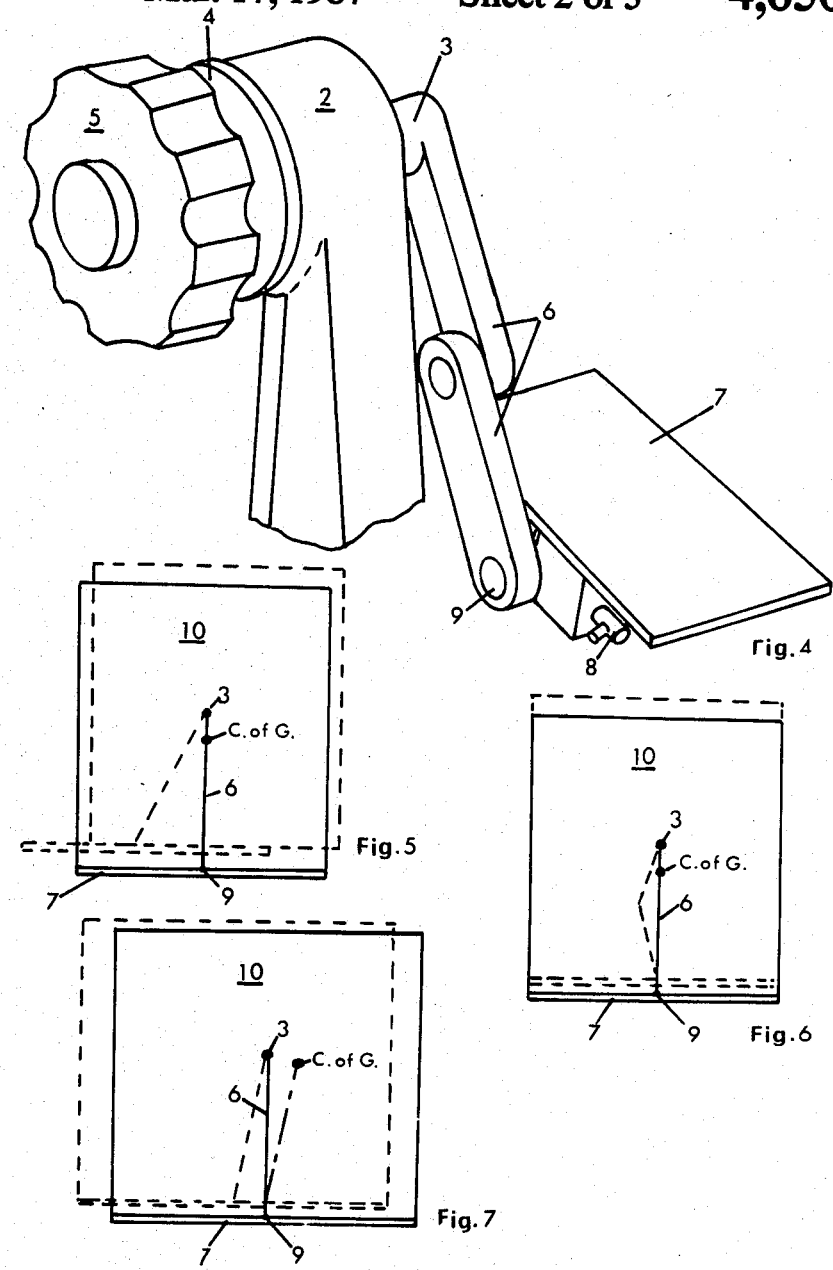

TILTABLE MOUNTINGS

REFERENCE TO RELATED APPLICATIONS

This application is a continuation-in-part of U.S. application Ser. No. 911,674, filed on June 1, 1978, now abandoned.

This invention relates to tiltable mountings and more particularly, though not exclusively, to tiltable mountings wherein the center of gravity of a camera, or the like, mounted thereon, is at or near, the axis of the pivot point of said tiltable mounting.

Available mountings of similar type suffer certain disadvantages, one of which is the difficulty, and often the inability, to align the center of gravity of the article, such as a camera, with the pivot point of the mounting so that the article has no apparent weight when tilted about the horizontal axis. The nearer the center of gravity of the article is to the axis of tilt the less becomes the apparent weight of the article and a more evenly applied torque, during transition of the article about the pivot point, may be obtained. With such a mounting, fitted with a drag unit, the constant force required to move the drag unit is the force required to move the article when the center of gravity of the article is on the axis of the pivot point. The drag unit may for example comprise an adjustable fluid damper, an adjustable friction device or even a combination thereof.

Accordingly it is a primary aim of the invention to provide a tiltable mounting wherein the apparent weight of an article mounted thereon may be easily minimized.

According to one aspect of the present invention there is provided a tiltable mounting having at least in part, a housing into which a first shaft is relatively rotatably fitted, a crank fixedly attachable to said first shaft having a second shaft crankedly located thereon and spaced apart from said first shaft and relatively rotatable and lockable attachments means on said second shaft for an article mount According to another aspect of the invention there is provided a tiltable mounting having at least in part, a housing into which a first shaft is relatively rotatably fitted, a first section of a crank fixedly attachable to said first shaft, a second section of said crank hingedly located and lockable to said first section of said crank having a second shaft crankedly located and spaced apart from said first shaft, and relatively rotatable and lockable attachments means on said second shaft for an article mount.

Figure 8:
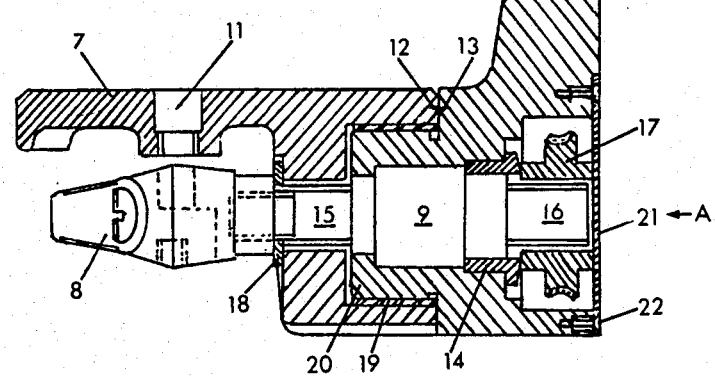

The invention will now be described, by way of example only, in conjunction with the accompanying drawings wherein like reference numerals indicate like elements and in which, FIG. 1 shows the basic system, FIGS. 2 and 3 show variations in the article mount attachment means, FIG. 4 shows a variation of the crank to accommodate a greater variety of center of gravity positions, FIGS. 5, 6 and 7 show examples of center of gravity compensation, and FIGS. 8 and 9 are a side elevation (partly in section and partly broken away) and an end view (partly broken away),respectively, of a further embodiment of the article mount.

Referring to FIG. 1 a support (1), part only shown, has a housing (2) mounted thereon and a shaft (3) journaled therein. A drag unit (4) preferably adjustable by a control knob (5) varies the torque required to rotate the shaft (3) within the housing (2). A crank (6) fixedly attachable to shaft (3) has an article mount (7) adjustably locatable means (8), which may conveniently be a split clamp lockable on a shaft (9), or a thumb screw (8A) in crank (6A) to lock shaft (9A) (as shown in FIG. 2 ), or as shown in FIG. 3 as a quadrant lockable to crank (6B) by a screw (8B) when pivoted about a screw acting as shaft (9B), or by any other known means of locking.

FIG. 4 shows the same basic system with crank (6D) fixedly, hingeable at a point along its length. The object of the hinged joint will become more apparent as the operation is explained. The two sections of crank (6D) may be locked in the desired position by any known means, indicated schematically at (6L) effectively vary the length of crank (6D).

Referring now to FIG. 5 a simple case of low center of gravity (c. of g.) is shown corrected. An article generally shown as (10) and enclosed by a solid line rests centrally on the mount (7) which is suspended on crank (6) about shaft (3). By rotating shaft (3) shaft (9) is raised, mount (7) is then rotated about shaft (9), or shaft (9) may be rotated within crank (6), to the horizontal position. The article may then be moved along mount (7) to the position shown by the broken line so that the c. of g. of the combined mass hanging on shaft 3 is aligned with shaft (3) and the article (10) will have no apparent weight when rotated on mount (7) about shaft (3).

FIG. 6 shows the same basic principle using the crank of FIG. 4 wherein the two sections are misaligned and locked to raise the c. of g. and mount (7) is rotated to obtain a horizontal position. By combining both movements the c. of g. may be aligned with shaft (3), as shown by the area enclosed by the broken line and the article will have no apparent weight when rotated on mount (7) about shaft (3).

FIG. 7 shows the more important case as found in practice, i.e. where the c. of g. is away from the crank (6) when the crank (6) is vertical. In practice a far greater degree of mis-alignment of c. of g. with shaft (3) can be tolerated in the vertical plane than in the horizontal plane, as the out of balance mass tends to swing towards the vertical and the arc of operation in normal use is rarely more than 90° about the vertical.

In FIG. 7 the mis-alignment is counteracted by contrarotating shaft (3) and shaft (9) and locking shaft (9) when the c. of g. is aligned with shaft (3) or is vertically below. Although the mount (7) is raised and its pivot point moves, the article (10) remains central on the mount (7) and rotation about shaft (3) shows no apparent weight of the article (10).

As aforestated it is preferable that the c. of g. is aligned with shaft (3) and it is apparent that with the hinged crank of FIG. 4 this is more easily achieved when the c. of g. is low and off the vertical.

Referring to FIG. 8 the second shaft (9E) is shown rotatably located in crank (6E) with the article mount (7E) rigidly fitted on the second shaft (9E). An article fixing means (11) is shown on mount (7E) which means may be a hole, an elongated slot, or a series of holes through which a bolt may be located to secure the article to the mount (7E) and assist center, of gravity location. The locking means (8E) on shaft (9E) when actuated, clamps mating faces (12) and (13) together to lock mount (7E) and (6E). Shaft (9E) pivoted in bearing

(14) has a square section end (16) on which is located a worm wheel (17), which, when rotated, will rotate shaft (9E). A second square section (15) on shaft (9) locates in mount (7E) and rotates mount (7E) with shaft (9E). Although in this example the section (15) is square it could conveniently be a splined shaft or the like, so that for large or gross adjustments locking means (8E) may be released, mount (7E) removed from shaft (9E), rotated relative to shaft (9) and then relocated on shaft (9E). A washer (18) on shaft (9) assists locking. Preferably mount (7E) is also located on a bearing (19) on a stub shaft (20) of crank (6E) to act as a second bearing for shaft (9E). A cover plate (21) may be fitted over the worm wheel (17) and secured by screws.

Referring now to FIG. 9, which is a view on arrow A shown in FIG. 8, a worm drive (23) is seen located in crank (6E) and when rotated by knob (24), assuming locking means (8E) is released, worm wheel (17) will rotate and mount (7E) will assume a new position relative to crank (6E). When the correct position is reached, locking means (8E) is actuated and the two mating faces (12) and (13) clamped together to make mount (7E) a rigid part of crank (6E). Worm (23) and wormwheel (17) provide greater stability to mount (7E) and stop inadvertent rotation of mount (7E) with an article mounted thereon when locking means (8E) is released. It also provides the fine adjustment of mount (7E) relative to crank (6E).

Crank (6E) may also be formed in two sections with a series of clearance holes (25) in one section mateable with a corresponding series of threaded holes (26) in the other section so that the length of crank (6E) may be variable using suitably threaded means (27). Alternatively the two sections may be slidably locatable for longitudinal adjustment with clamping means for securement of the two sections, one with the other, at the desired extension.

It is to be understood that many variations of clamping devices may be used for securing the pivot points of the apparatus without deviating from the invention.

It is also to be understood that the support (1) may be located on any known mounting and control in the pan axis will be determined by the type of mounting to which the apparatus is fitted. Furthermore support (1) may be in the form of a "U" bracket and two cranks (6), shafts (3) and drag units (4) may be used with the platform (7) pivotably located therebetween.

I claim as my invention:

1. A tiltable mounting comprising, a housing, a first shaft rotatably mounted in said housing, a crank fixedly attached to said first shaft, a second shaft mounted on said crank and spaced apart from said first shaft, an article mount, lockable attachment means for releasably securing said article mount on said second shaft, article securing means for enabling adjustment of the position of an article on the article mount relative to said second shaft, and fine adjustment means for enabling fine adjustments in the position of the said article mount relative to said second shaft and for preventing the article mount from pivoting about the second shaft when said lockable attachment means is released from securing said article mount on said second shaft.

2. A tiltable mounting as claimed in claim 1 wherein said crank comprises at least two sections which are lockable one with the other so that the effective length of said crank may be adjustable.

3. A mounting as claimed in claim 1 further comprising gross adjustment enabling means for permitting gross adjustments in the position of said article mount relative to the second shaft.

4. A mounting as claimed in claim 1 wherein said fine adjustment means comprises a wormwheel connected to said second shaft and a worm for driving said wormwheel.

5. A mounting as claims in claim 3 wherein said gross adjustment means comprises a shaped portion of said second shaft and a cooperating shaped portion of said crank defining an opening in said crank through which said second shaft extends, whereby removal of the article mount from the second shaft, rotation of the article mount relative to the second shaft, and replacement of the article mount on the shaft at a different angular position provides said gross adjustment.

6. A mounting as claimed in claim 3 wherein said lockable attachment means comprises a locking device located on one end of second shaft for clamping a portion of the article mount into engagement with a mating portion of the crank thereby securing said article mount to said second shaft.

7. A mount as claimed in claim 4 wherein said lockable attachment means comprises a locking device located on said second shaft for clamping one surface of said article mount to a mating surface of said crank thereby securing said article mount to said second shaft.

* * * * *